April 26, 1932. H. B. DROSIN 1,855,948
FOOD PREPARATION
Filed Dec. 10, 1929

WITNESSES

INVENTOR
Henry B. Drosin
BY
ATTORNEYS

Patented Apr. 26, 1932

1,855,948

UNITED STATES PATENT OFFICE

HENRY B. DROSIN, OF NEW YORK, N. Y.

FOOD PREPARATION

Application filed December 10, 1929. Serial No. 413,063.

This invention relates to a food preparation, the object being to provide a food preparation which includes fish, onions and other ingredients which may be eaten cold or hot and which may be preserved for an indefinite time in air-tight containers.

Another object of the invention is to provide a fish preparation which is in the nature of what is commonly known as "gefielte" fish or filled fish, which is canned so as to be preserved for future use.

In order that the method or process may be more clearly understood, reference is made to the accompanying drawings, wherein Figure 1 is a sectional view through a container showing a number of molds or small containers mounted therein and ready to be heated;

Figure 1:
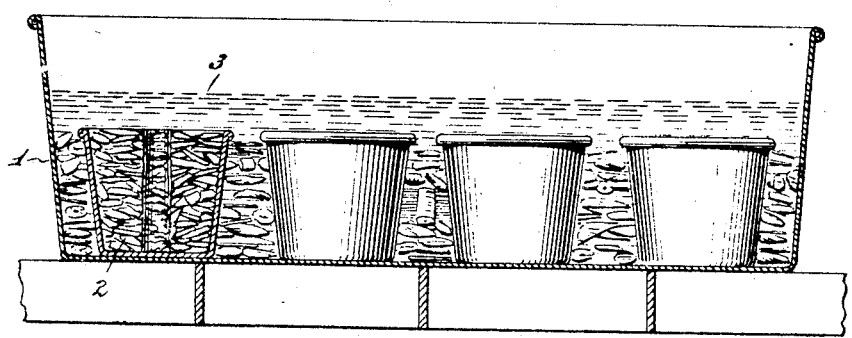
Figure 1:
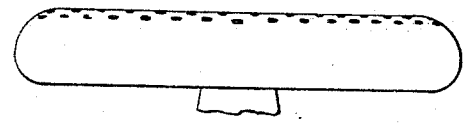
Figure 2:
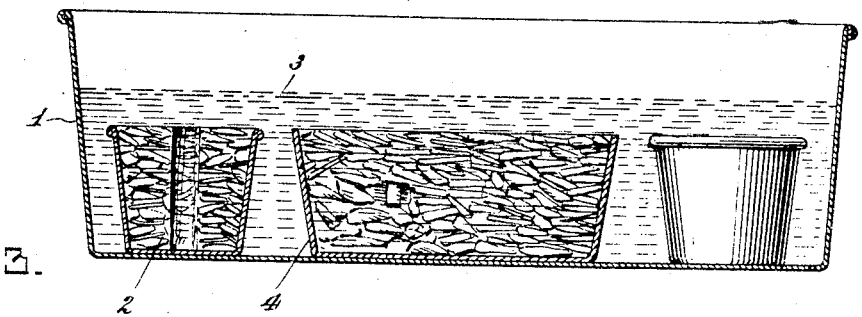
Figure 2 is a sectional view similar to Figure 1 but showing a modified arrangement wherein the bones and unused parts are cooked for making the filling broth a jelly.

In producing a food preparation embodying the invention a large kettle or container 1 is used, and into this is placed some containers or molds 2 of a desired shape. Into these containers are placed the prepared ingredients, and on the outsides of these containers are placed the skin and bones of the fish. The containers 2 are then submerged in water 3 and the container 1 with its contents is heated. As a modified arrangement the bones, skins and the like are placed in a separate container 4, as shown in Fig. 2. This container is preferably of the same height as the molds 2, so that the level of water 3 may be the same as shown in Fig. 1. After the different parts have been thus prepared heat is applied and the ingredients in the molds are cooked, and also the ingredients surrounding the molds in the container 4 are cooked. The cooking operation is carried on until most of the water has evaporated. The molds or containers 2 are removed and the soup or sauce is cooked for a further period to thicken the same. After it has been thickened to the desired extent the different molds are supplied with the sauce until they are filled, after which the molds or containers are sealed with an air-tight seal. The sauce gradually permeates the preparation in the molds and maintains the same moist for an indefinite time after the molds have been sealed. After sealing the molds are placed in a steam chest or in water and heated to a desired extent to sterilize the same. After this operation the product is in condition for use or sale and may be stored for long periods of time without injury or may be sold or used immediately.

Figure 3:
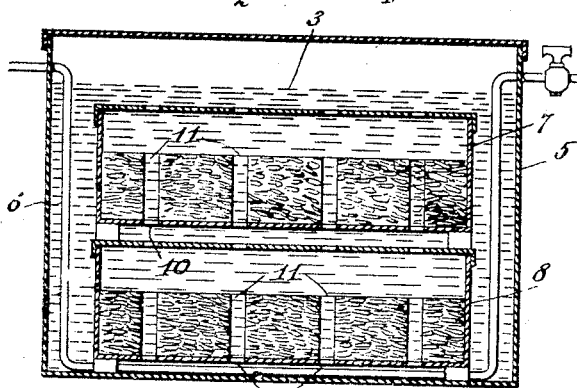
Figure 3 is a sectional view through a modified form of the device shown in Figure 1 illustrating how the product may be made in large quantities.
Figure 4:
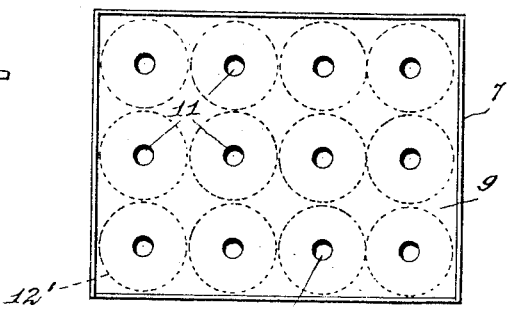
Figure 4 is a top plan view of one of the containers shown in Figure 3.
Figure 5:
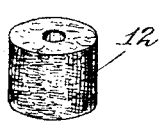
Figure 5 is a perspective view of the finished product ready to be canned or eaten.

In order that the method may be more fully presented, a specific example of how a certain batch may be produced is as follows: To make a batch of about two pounds, it is necessary to take two pounds of raw fish in the natural state, and this quantity may be a single fish or two or three small fish. The skin and bones and other matter are removed, so that only the edible flesh is left, and this flesh will equal approximately one pound, while the skin, bones and other matter will equal the other pound. The fish is in a raw state at this time. Any desired fish may be used, preferably yellow pike and white fish in equal proportion. Under some circumstances mackerel, trout, bass or other fish may be used, but the yellow pike and white fish produce the most desirable product. After the one pound of cleaned, raw, edible part of the fish has been secured, as above-mentioned, one-half pound of onions is added to the fish and is ground or chopped into small pieces preferably after having been mixed with the fish. Two raw eggs are then added to the above mixture and a half-cup of cracker meal. Salt and pepper are added to suit the taste and also a little saffron (a quarter of a teaspoonful). After all the above ingredients have been gathered together they are thoroughly mixed by any suitable means and then placed in a single container or mold or in a plurality of containers or molds, each mold being filled to the top, except for a central opening extending from the top to the bottom. The molds are preferably glass jars of a type to receive air-tight sealing covers, and after the process has been completed the filling is left in the molds and sold in that condition. After the molds have been filled a large open container is secured and the molds are placed therein. The skin, bones and other matter discarded when the fish is first prepared are placed in the container around the molds and then water is supplied until the molds have been covered for an inch or two. Also, about three-quarters of a pound of chopped, raw onions is added to the water and placed outside of the molds. Salt and pepper in suitable proportion to produce a proper taste are added to the water and then the container, water and molds are subjected to heat. The ingredients thus prepared and placed in the molds and container outside the molds are subjected to heat which may be provided by a steam chest or by a stove or other means, the heat being such as to maintain the water at boiling temperature (212° F.), and this temperature is maintained for about thirty minutes. After the preparation has been maintained at about 212° F. for thirty minutes the heat is reduced until the liquid merely simmers, rather than boils, and the ingredients are maintained at this simmering heat for an hour and a quarter to an hour and a half. The liquid outside of the molds is then drawn off and strained, so that the bones, skins and the like may be discarded. The strained liquid is then heated preferably to a boiling point and maintained at this heat until only about one-third is left, said third having, when cold, almost the consistency of jelly. At the time that the liquid is drawn off the molds are removed and emptied, after which the ingredients in each container are decorated with pieces of carrots which have been parboiled. The decorated ingredients are then placed back in the mold or in other containers, as for instance, other glass jars. After having been placed back in the molds or other glass jars the ingredients are slit at one point from the opening in the center to the periphery. This slitting operation may be done at some other point in the process without departing from the spirit of the invention. Into the slit is forced a wedge which may be of the same material as the contents of the glass or may be a parboiled piece of carrot. The wedge spreads the material in the glass jar or mold and causes the same to press tightly against the walls of the jar, thus presenting a nice appearance and preventing breaking up of the material from a solid mold formation during ordinary handling. The use of the wedge is of particular importance when tapering jars are used as shown in Figures 1 and 2 as it causes the material to flare and spread to fit the jar snugly at all points over the walls of the jar. The central hole permits a ready expansion of the article and presents a compartment for receiving the sauce which overflows the article and thereby fills the container. Preferably the slit is arranged opposite one of the parboiled strips of carrot which may be used for decorative purposes, but the slit does not go through the carrot which is on the outside surface. In this way the wedge will not be seen from the outside of the glass jar. After the wedge is placed in position the concentrated sauce while in a hot condition is poured into the glass jars to fill the opening in the center of the ingredients thereof and to usually cover the top surface. After this has been done the glass jars or molds, as the case may be, are sealed by a suitable sealing cover and then placed into a steam chest or into water and heated. The heating is sufficiently high and sufficiently long to sterilize the contents. This usually takes approximately one hour at 225° to 230° F. After the sterilizing operation the food product is in condition for storage, sale or other use. If stored or placed on the shelves of a store the preparation will keep for an indefinite time and may be opened and used at any time. The ingredients are in condition to be eaten cold or may be heated while in the mold or jar, or heated after having been removed from the mold or jar. By reason of the particular method used in cooking the ingredients in molds and then applying a wedge, the ingredients in each jar or mold are maintained in their original shape and when emptied will present a pleasing appearance to the user. Unless the ingredients are molded in the different molds, as set forth, the mass will break into small pieces and therefore will not be as salable because of its lack of pleasing appearance, though the taste would be the same.

Where the product is to be made in large quantities the process may be slightly varied and the arrangement shown in Figures 3 and 4 used to secure the desired result. In these figures it will be noted that 5 is an outside container or casing adapted to receive the liquid and heating coils 6, whereby steam may be used as the heating element. Arranged in the casing 5 are article containers 7 and 8. As these containers are identical, the description of one will apply to both. As shown in Figure 3, two of these containers have been disclosed, one placed on top of the other in order that a larger quantity of finished product may be made in one batch. As shown in Figure 4, the container 7, for instance, is filled with material 9 similar to the material 2 shown in Figure 2, and then pins or cutting members are inserted through the apertures 10 for providing holes or passageways 11 in the material 9. After this has been done the containers 7 and 8 are arranged as shown in Figure 3 and liquid 3 added similar to the liquid shown in Figure 2. In this case the various ingredients disclosed in the pan 4 may be arranged exteriorly of the containers 7 and 8, but interiorly of the casing 5. After the parts have been thus properly prepared steam is admitted to the heating coils or pipes 6, and after the heat has been maintained a desired length of time to secure the desired cooking operation it is turned off and the containers 7 and 8 removed. As soon as the containers 7 and 8 are removed blocks or portions 12 are cut therefrom, as indicated by the dotted lines 12' shown in Figure 4. These are tubular members and may be served with some of the liquid 3 immediately or may be placed in tubular cans or jars and provided with the wedges, as above described, and also with some of the strained liquid 3. When following this method the product is in appreciable quantities, and it is intended that the blocks 12 shall be comparatively large, as for instance, a quart size, gallon size or even larger. This modified form of the method is to provide large quantities for hotels and other places where comparatively large supplies are needed. It will be noted, however, that the same process is followed in preparing the ingredients, subjecting the same to heat and liquid and then cutting the same and arranging the cut parts in containers and jars for preservation.

What I claim is:—

1. A commercial article consisting of a glass container tapering from one end to the other whereby the top will be of greater diameter than the bottom, a single article of food positioned in said container divided at one point from the top to the bottom, a wedge positioned at said point, said wedge causing said article of food to press against the walls of said container, and a sauce filling the uneven parts of said article of food.

2. A commercial article consisting of a glass container, a tubular article of food positioned in said container divided by a slit at one point from the top to the bottom, an article of food forming a wedge positioned in said slit and acting to hold the first mentioned article of food against the walls of said container, and a filling of sauce positioned centrally of the first mentioned article of food.

HENRY B. DROSIN.